United States Patent
Gustafson (10) Patent No.: US 11,071,408 B1
(45) Date of Patent: Jul. 27, 2021

(54) SKEWER RACK ASSEMBLY

(71) Applicant: Charles Bruce Gustafson, Littleton, CO (US)

(72) Inventor: Charles Bruce Gustafson, Littleton, CO (US)

(*) Notice: Subject to any disclaimer, the term of this patent is extended or adjusted under 35 U.S.C. 154(b) by 0 days.

(21) Appl. No.: 16/698,492

(22) Filed: Nov. 27, 2019

Related U.S. Application Data (60) Provisional application No. 62/917,254, filed on Nov. 30, 2018.

(51) Int. Cl.
*A47J 37/04* (2006.01)
*A47J 43/28* (2006.01)

(52) U.S. Cl.
CPC .......... *A47J 37/041* (2013.01); *A47J 43/283* (2013.01)

(58) Field of Classification Search
CPC ...... A47J 37/041; A47J 43/283; A47J 37/049; A47J 37/0694; A47J 43/18; A47J 37/04; A47J 37/07
USPC .............. 99/421 H, 427, 421 R, 448, 421 A, 99/421 HH, 419; 219/732; 220/772, 812
See application file for complete search history.

(56) References Cited

U.S. PATENT DOCUMENTS

| | | | | |
|---|---|---|---|---|
| 4,942,862 A | * | 7/1990 | Alden | A47J 37/0694 126/337 R |
| 5,715,744 A | * | 2/1998 | Coutant | A47J 37/041 99/419 |
| 5,887,513 A | * | 3/1999 | Fielding | A47J 37/04 99/419 |
| D417,124 S | * | 11/1999 | Chen | 211/60.1 |
| 6,155,162 A | * | 12/2000 | Wang | A47J 37/0694 99/419 |

OTHER PUBLICATIONS https://barbecuebible.com/product/best-barbecue-kabob-rack-skewers-set/ (Year: 2013).*
Amazon.com: kabob rack, pp. 1-7.

* cited by examiner

*Primary Examiner* — Robert J Utama
*Assistant Examiner* — James F Sims, III
(74) *Attorney, Agent, or Firm* — Patricia C. Brzostowicz; Superior Patent Group, LLC (57) ABSTRACT

A pair of steel skewer racks can be used with flat skewers straddling them. A slanted base face outbound from the vertical support walls to create a wing for rising heat. The inner edge of the slanted base rises slightly above the grill under the vertical support wall. Heat is directed into the central cooking area and away from the skewer tip and handle exposed to the outside area of the opposing racks. The chef's rack has a horizontal groove with a locking lip to lock a food laden skewer in either an up or a down orientation. Vertical slots provide the skewer to be locked at a 90-degree orientation. At the top of the rear rack are semi-circle grooves. The independent racks can be separated to accommodate any length skewer or nested together.

17 Claims, 11 Drawing Sheets

SKEWER RACK ASSEMBLY

CROSS REFERENCE APPLICATIONS

The present non-provisional application claims priority to provisional application No. 62/917,254 filed Nov. 30, 2018 which is incorporated herein by reference in its entirety.

FIELD OF THE PRESENT INVENTION

The present invention relates to providing a flat skewer rack device for cooking kebobs/skewered suspended above a heat source and free from contact with a barbeque grill surface.

BACKGROUND

Amazon® sells a variety of skewer racks for kabobs. A Unicook rack is a foldable rectangular stand that will accommodate only one length skewer while requiring large storage space. Cleaning filthy debris at the folding parts of the device is difficult. Without locking grooves, the suspended kabob rotates to its center of gravity preventing even cooking. Wooden skewer handles and tip ends exposed to direct heat burn.

Figure 12A:
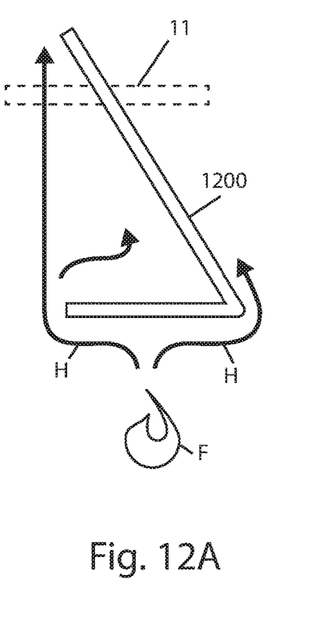
FIG. 12A is a side elevation sketch of a first prior art design and heat flow.

A Cave Tools kabob rack has a profile design shown in FIG. 12A. Heat rises around the outside of the rack stabilizer base as shown by arrow H1 and burns the wooden skewer ends. The top rack skewer locking design secures a flat skewer at a 45-degree orientation to the direct grill heat that limits the ability to efficiently cook foods cut to a flat plain or food such as shrimp and scallops. A difficulty in rotating the skewer exists because the locking design is on both forward and rear racks so a kabob must be lifted entirely out of the front and rear rack for rotation. The sharp acute angle bend B on the interior of the stabilizing base collects grease and filthy debris difficult or impossible to clean.

The Goutime and other racks suffer from similar shortcomings.

What is needed in the art is a set of stable independent opposing metal stands that limit skewer ends from burning by directing the heat towards the food between the racks and away from the exposed wooden skewer tips and handles outside the racks center. Also needed is a top groove design with the options to lock the food laden wooden skewer in incremental quarter turns, opposing 180 and opposing 90-degree orientations, to control direct heat at the skewered object for even cooking. Also needed is a design that allows for locking the laden skewer at the forward rack while providing for easy turning by using only a placement groove at the rear rack for the skewer tip to rest while twisting the handle. Also needed is a design providing smooth accessible surfaces for cleaning while providing nesting of the suspension racks for efficient storage. The present invention provides these features and more.

SUMMARY OF THE INVENTION

The present invention provides a set of racks that more efficiently elevate suspended skewers of food from contact with the grill surface and limits burning of wooden skewer ends with its upward slanted base that directs heat centrally between the racks away from the skewer handle and tip ends extended outside of the central cooking area.

Another aspect of the present invention provides for more efficient cooking with its locking notched groove design at the top of the forward rack that prevents a suspended food laden wooden skewer form twisting to its bias and also provides control for a variety of angles the food can be exposed to direct heat, 180 opposing degrees and 90 opposing degrees. The front rack grooves are also designed with slots for a flat metal skewer twisted to form a screw at the handle the ability to be rotated and locked in position at any of 360-degree orientations the food may face the direct heat.

Another aspect of the present invention provides for ease of twisting the skewer by incorporating semi-circle grooves on the rear rack to rest and thus maintain placement of the skewer tip during the turning or twisting process. The semi-circle at the top also allows for efficient removal of the kabob when the cooking process is finished.

Another aspect of the present invention is to provide separate forward and rear racks that can be placed apart from each other to accommodate any length of skewer or nest together during storage. The forward or rear rack have a slight length difference to provide for a snug nesting of the two racks.

Another aspect of the present invention is to provide triangular ends on the racks for stability purposes necessary due to the angled base that directs the heat to the center of the racks.

Another aspect of the present invention is to provide rounded edges at all cut outs and surfaces and eliminate any sharp acute angles or bends to accommodate an easy and thorough cleaning process.

Other aspects of this invention will appear from the following description and appended claims, reference being made to the accompanying drawings forming a part of this specification wherein like reference characters designate corresponding parts in the several views.

SUMMARY DESCRIPTION

A skewer rack device for cooking kebobs suspended above a heat source free from contact with a barbeque grill surface. The pair of independent opposing racks have keeper notches at the front rack and semi-circle grooves on the rear rack that secure a flat skewer in a locked position to keep the kabob from rotating to its bias. The top of the forward rack facing the chef include a plurality of notches designed to lock a wooden skewer at the desired position facing the direct heat in quarter turn increments to provide for evenly cooking all sides of the kabob. A metal skewer with a twist forming a screw at the handle end will orient the kabob to face the direct heat at any of 360-degree angles. The opposing rack at the rear furthest from the chef has semi-circle grooves that serve as placement grooves to rest the tip of the skewer during the rotation process when the chef is twisting the kabob by the handle to the desired orientation the kabob faces the direct heat. The base of the racks is bent to less than a 45-degree angle to direct heat away from the exposed wooden handle and tip and toward the central cooking area between the opposing racks to limit burning the wooden handle and tip outside of the opposing racks. The ends of the racks have a triangular bend for stability while placed on the surface of a grill. Independent front and rear racks may be placed apart to accommodate any skewer length and yet nest snugly together during storage. All cut outs are rounded smooth and formed bends are slight or gentle to provide for easy and thorough cleaning.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Referring first to FIGS. 1A,1B,2,3,4,5 the kebob rack assembly is designated 1. A front rack (relative to the chef) is designated 2. A rear rack is designated 3. Nominal dimensions include D1=10.25", D2=10.19", D3=1.2", D4=1.5", D5=1.2", angle A=12° (variable from 8 to 16°). The slightly smaller D2 allows nesting of rack 3 into rack 2. Vertical walls 32,33 are supported above the grill by respective bases 17,71.

The chef grooves 10 allow the handle 11 of the flat skewer 12 to rest on flat base 16 and be locked into chef grooves 10 by lip 14. The skewer cannot be twisted by the biasing weight of the food 20 on the skewer 12. Vertical slots 15 allows for a 90° change of orientation while still preventing any twisting of the flat skewer.

The back grooves 16 are semi-circular to allow rotation of skewer 12. The chef ledge protects the handle 11 from heat rising directly from the flame. The angle A directs heat into the central cooking area CA and reduces any heat energy from travelling outside the rack 2 and burning the handles 11.

An optional metal skewer 120 has a 180° twist 121 to facilitate flipping the skewer.

Figure 1A:
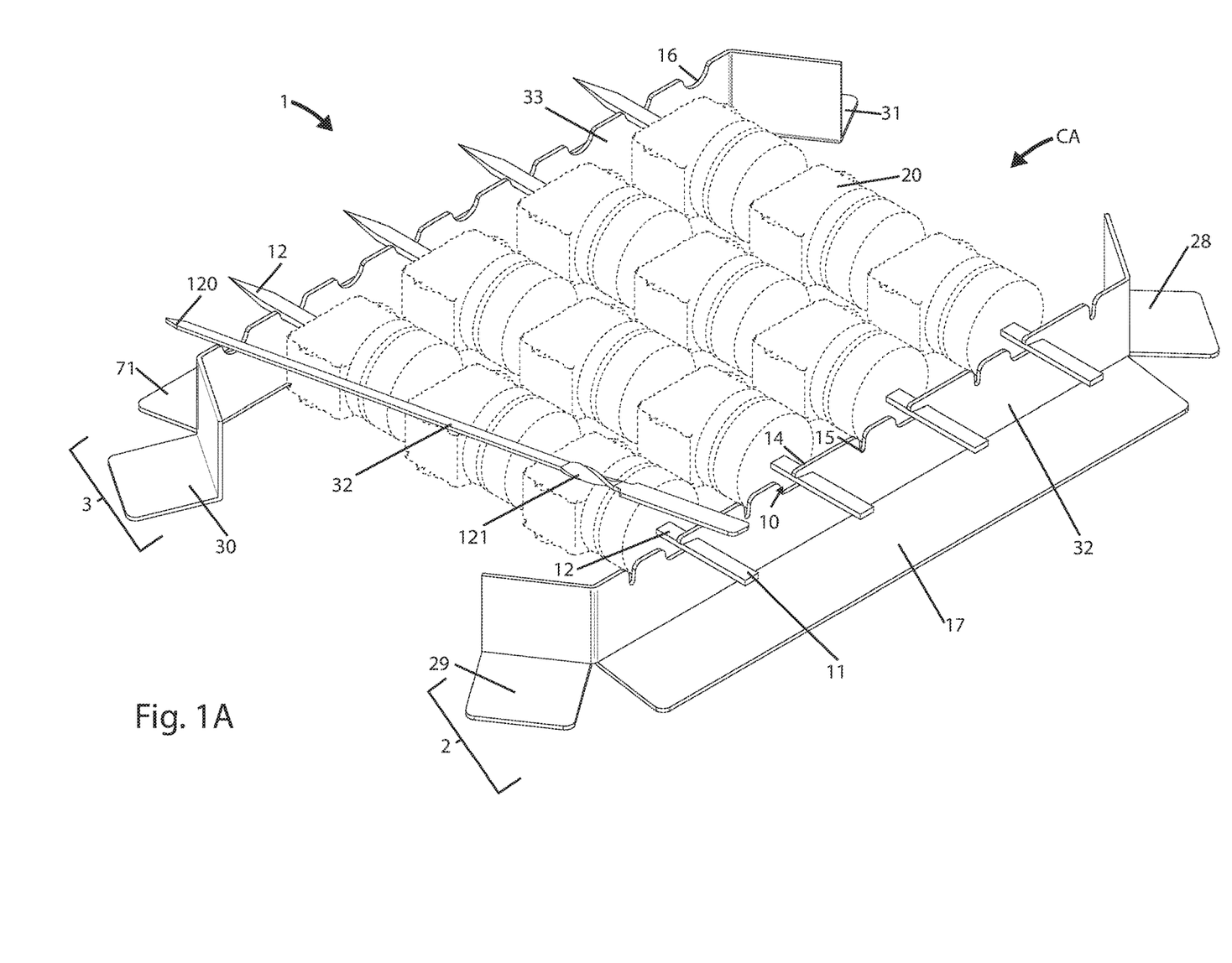
FIG. 1A is a top perspective view of the skewer racks in use.
Figure 1B:
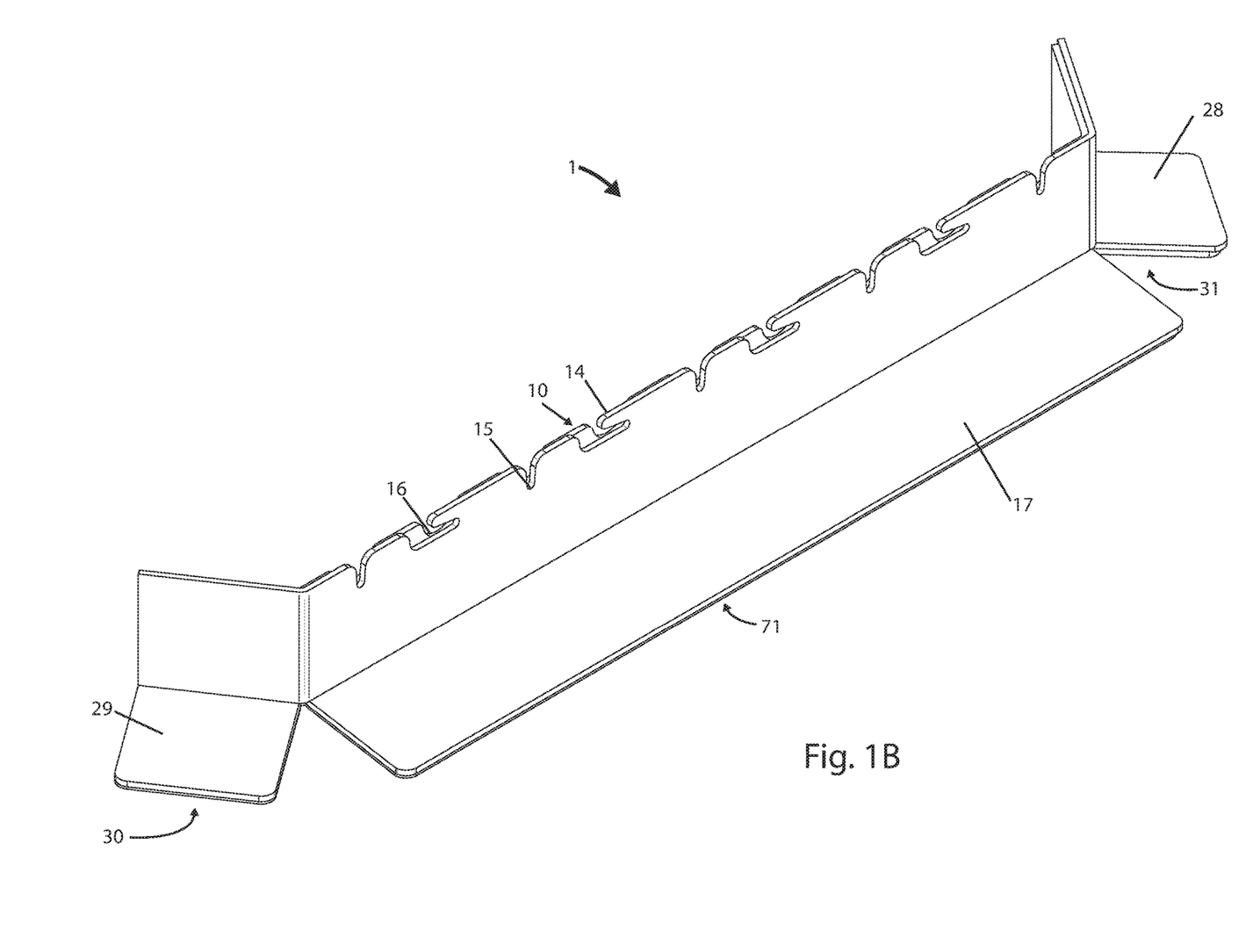
FIG. 1B is a top perspective view of the skewer racks nested.
Figure 2:
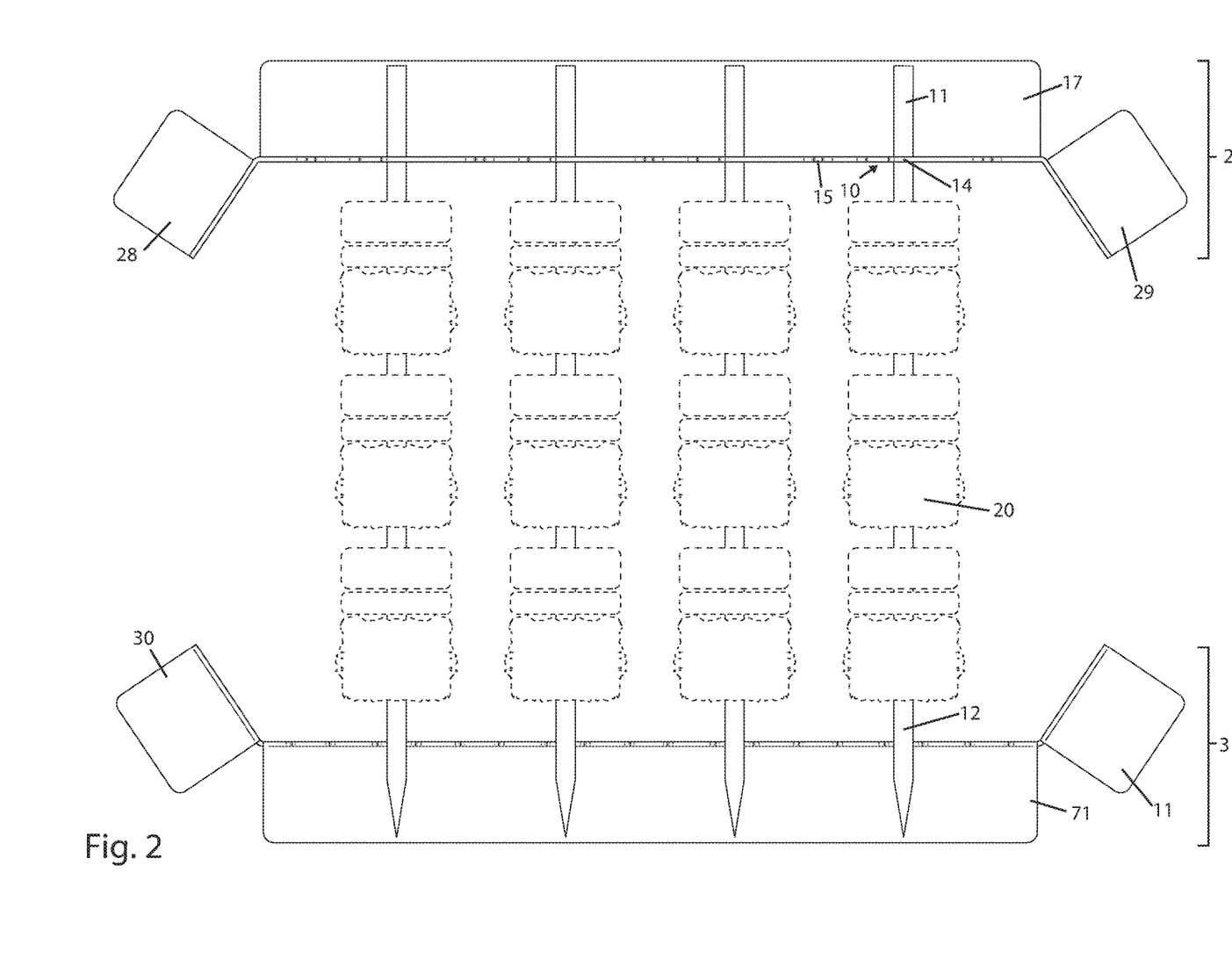
FIG. 2 is a top plan view of the skewer racks in use.
Figure 3:
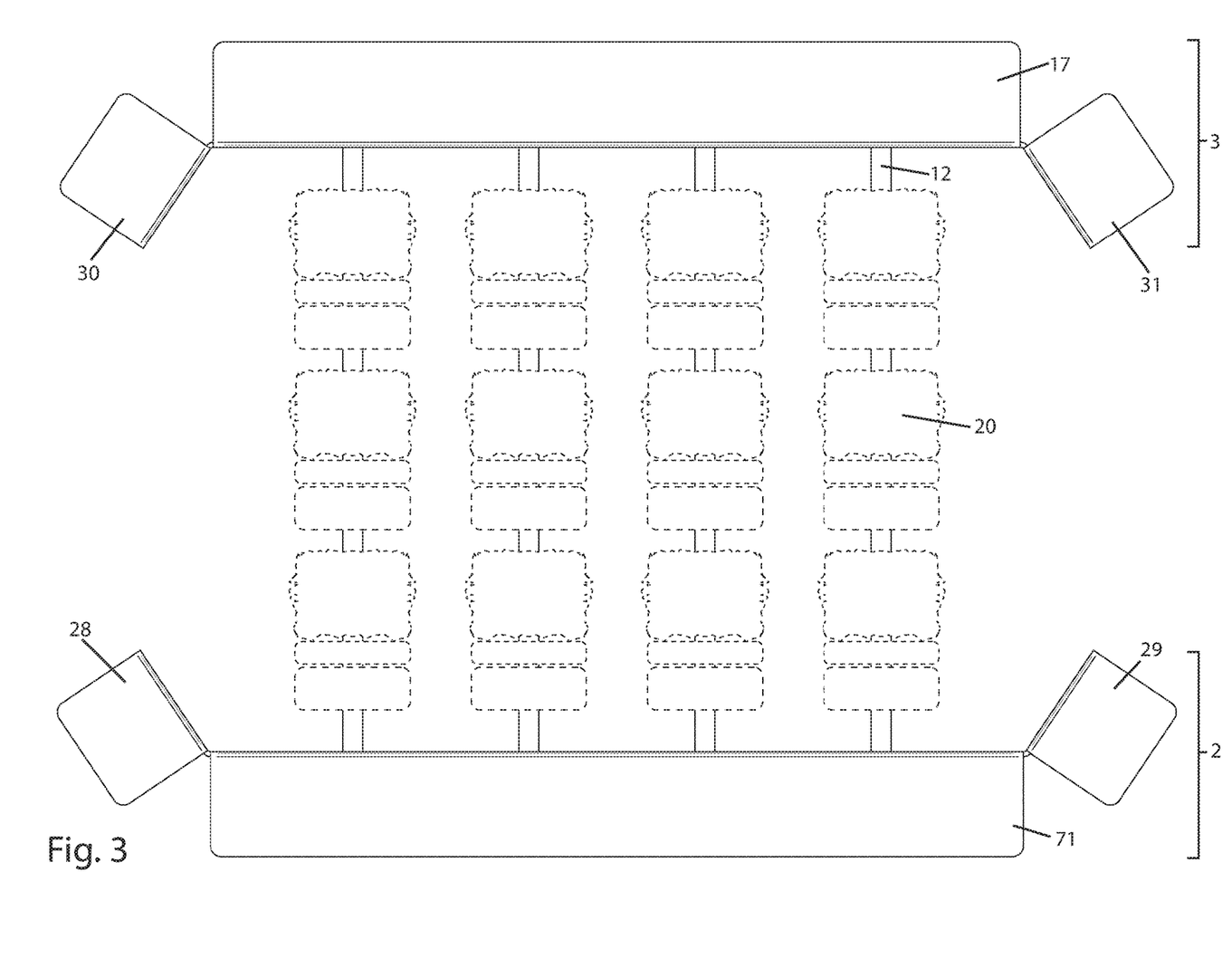
FIG. 3 is a bottom plan view of the skewer rack in use.
Figure 4:
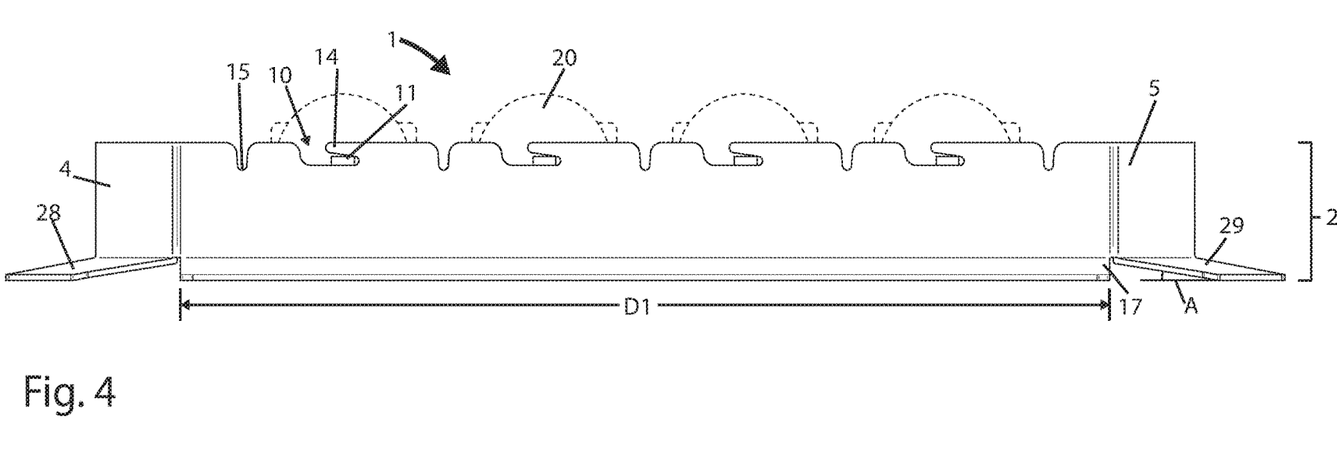
FIG. 4 is a front elevation view of the skewer racks in use.
Figure 5:
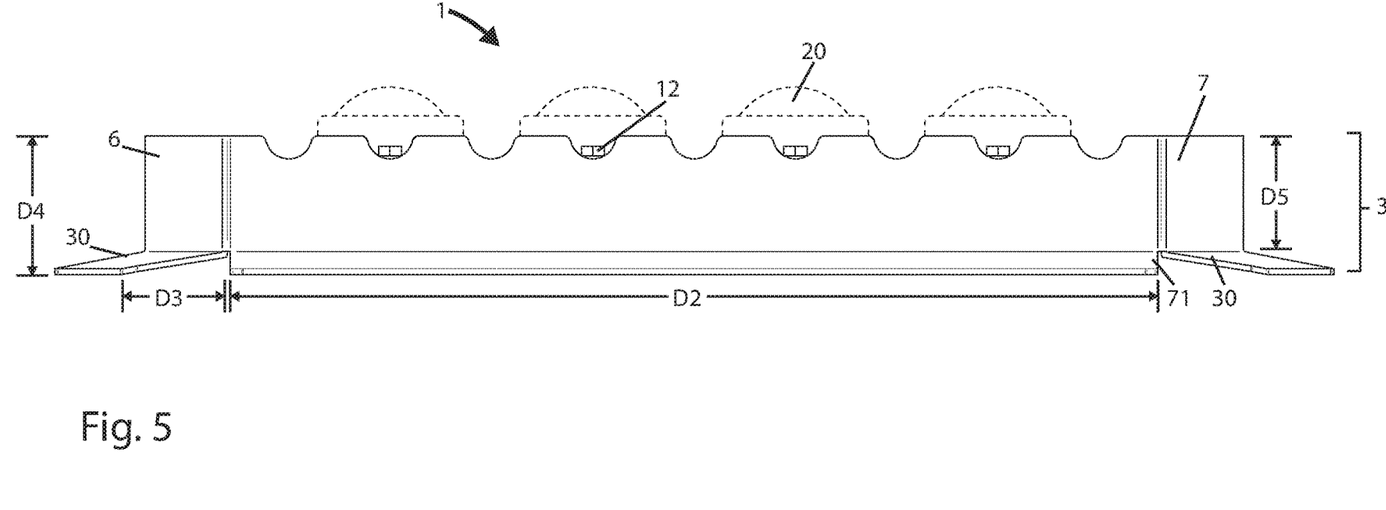
FIG. 5 is a rear elevation view of the skewer racks in use.
Figure 6:
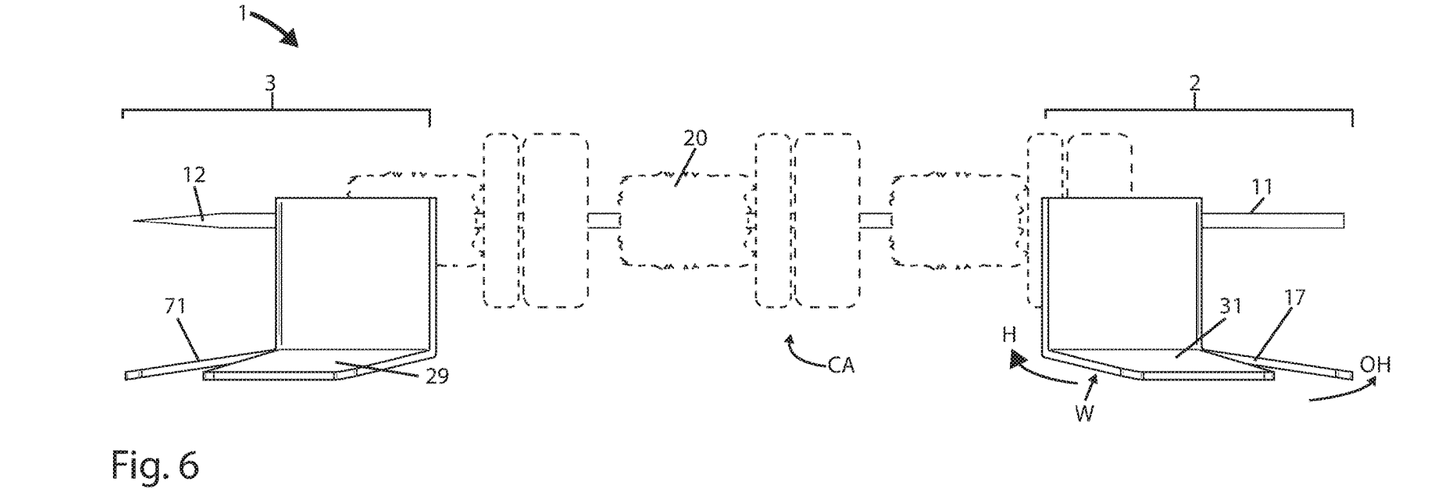
FIG. 6 is a side elevation view of the skewer racks in use.

Referring next to FIG. 6 the handle 11 is protected from burning by the directing of heat H into the cooking area CA. Only a small amount of heat OH passes by the handle 11. The angle A actually forms a wing with increased airspeed at point W.

Figure 7:
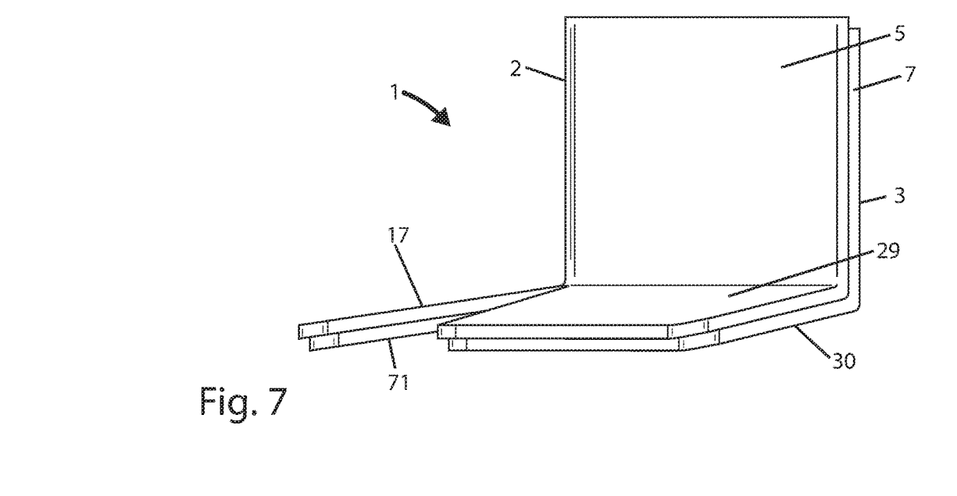
FIG. 7 is a side elevation view of the skewer racks nested.
Figure 8:
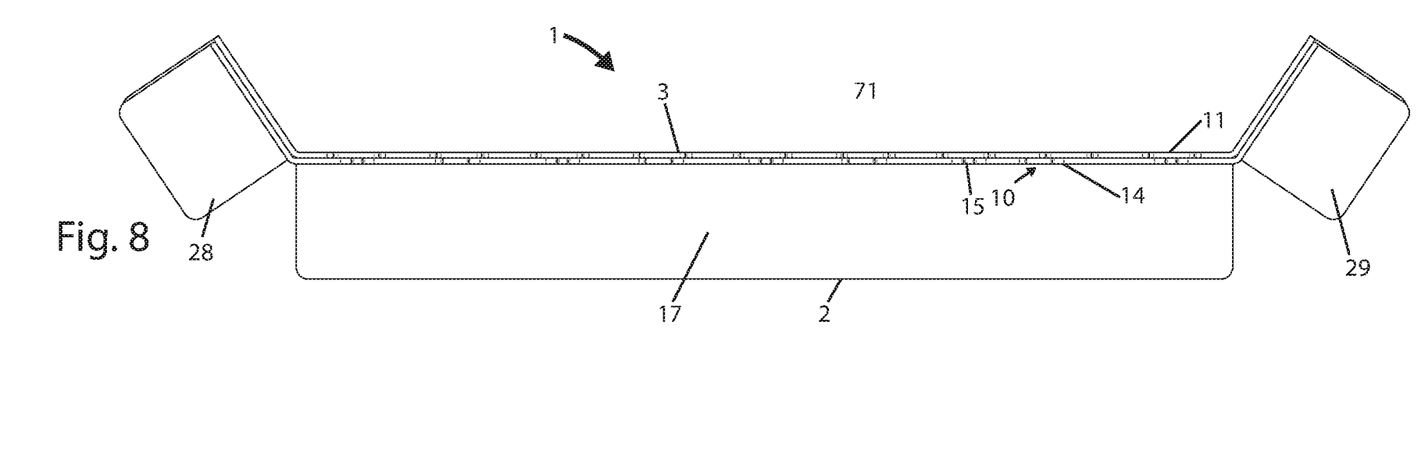
FIG. 8 is a top plan view of the skewer racks nested.
Figure 9:
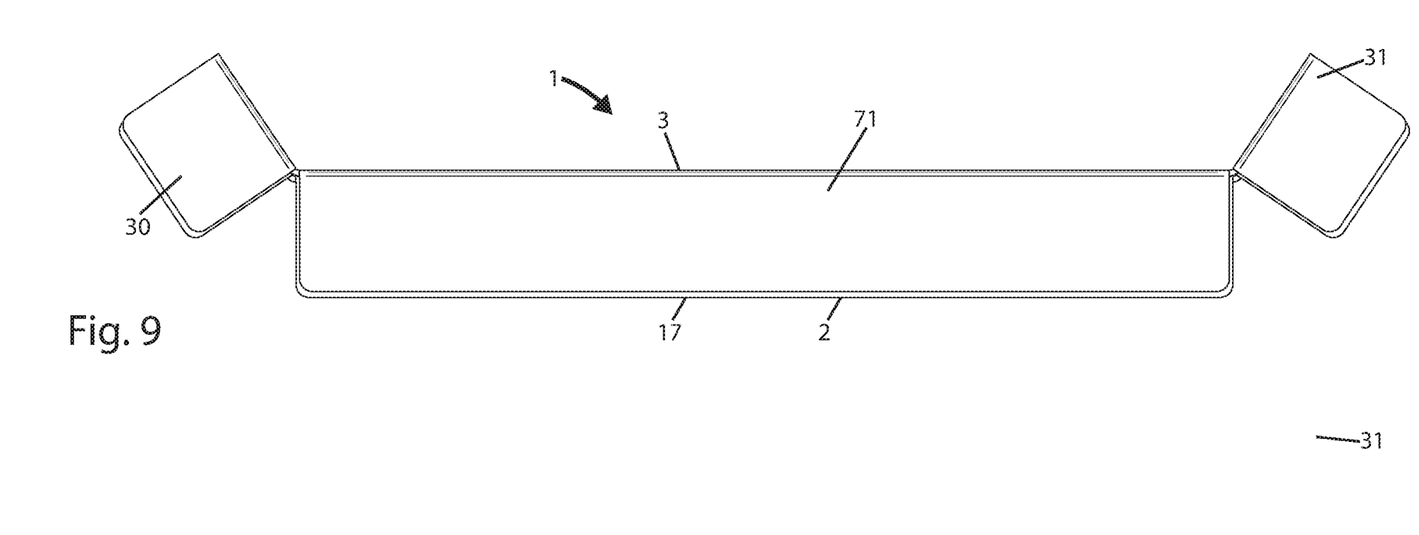
FIG. 9 is a bottom plan view of the skewer racks nested.
Figure 10:
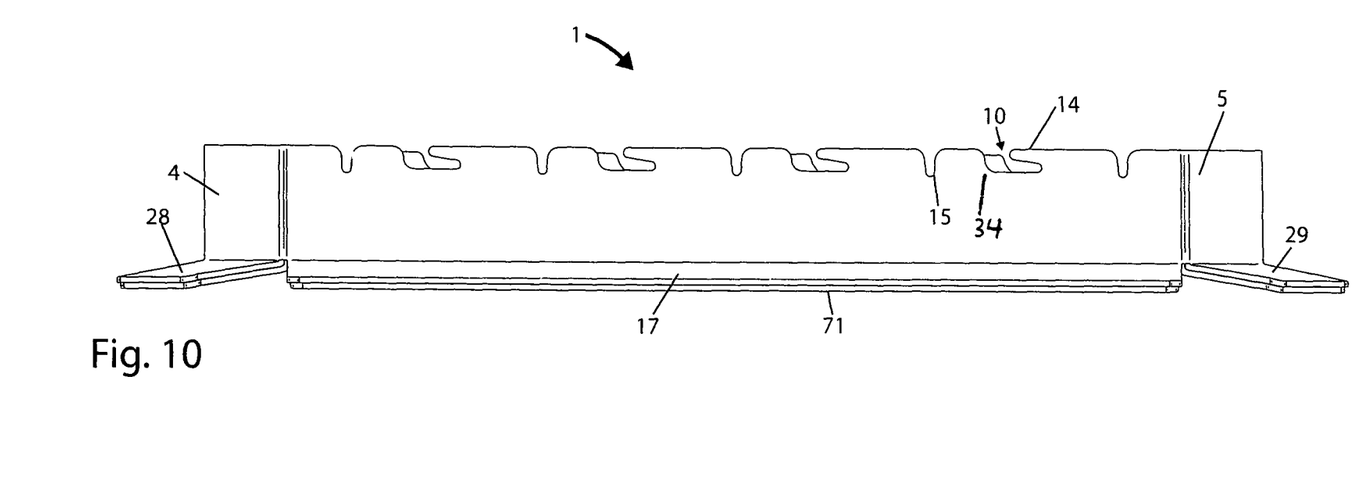
FIG. 10 is a front elevation view of the skewer racks nested.
Figure 11:
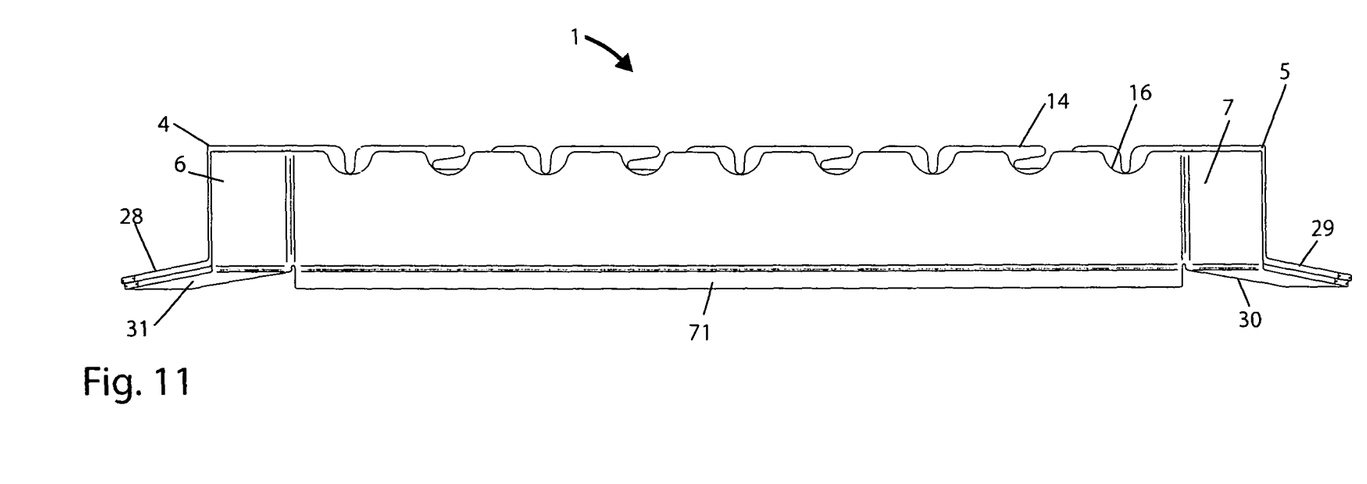
FIG. 11 is a rear elevation view of the skewer racks nested.

FIG. 7 shows rack 3 nested into rack 2. FIGS. 8,9 shows the slanted base 17 of rack 2 covering the slanted base 71 of smaller rack 3. FIGS. 10, 11 show front (FIG. 10) and rear (FIG. 11) views of the nested racks 2,3.

FIG. 12A shows a prior art skewer rack 1200. The heat H travels up on both sides evenly of the skewer rack 1200. Thus, the skewer handle 11 gets burnt. The flame is designated F.

Figure 12B:
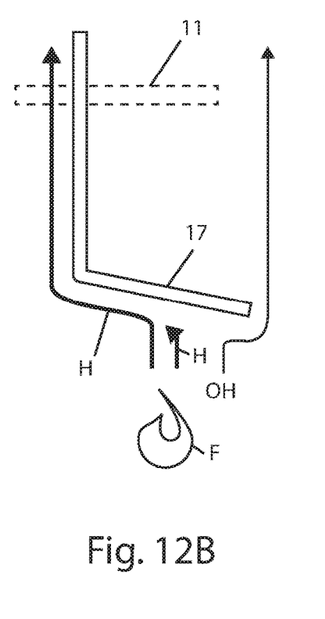
FIG. 12B is a side elevation sketch of the present invention heat flow.

FIG. 12B represents the heat flow for the present invention 1 that does not burn the skewer handle 11.

Figure 12C:
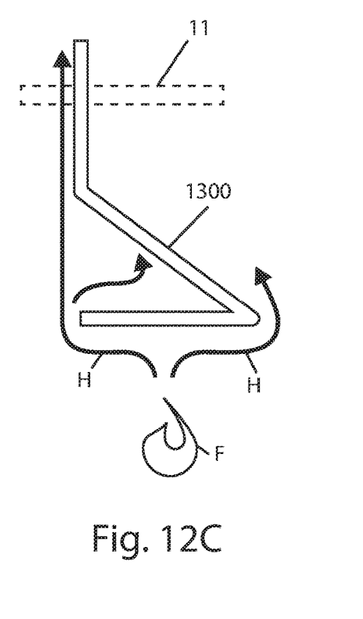
FIG. 12C is a side elevation sketch of a second prior art design and heat flow.

FIG. 12C shows another prior art skewer rack 1300. Heat H flows evenly up the outer edges of the skewer rack. Thus, the skewer handle 11 gets burnt.

Figure 13:
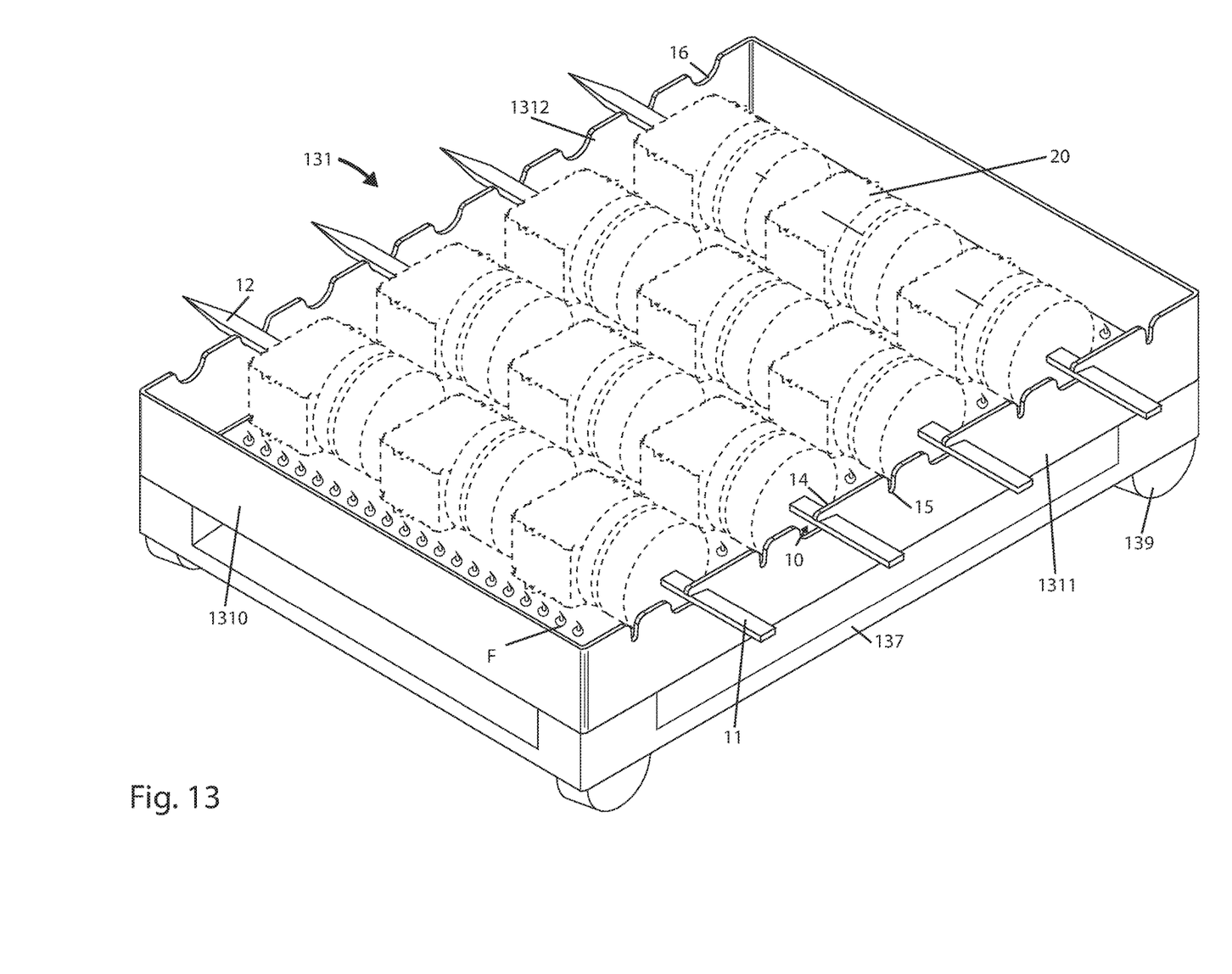
FIG. 13 is a front perspective view of a hibachi.

Referring next to FIG. 13 a hibachi 131 has a traditional lower body 137 with wheels 139. A top peripheral edge 1310 comprises a built-in chef rack 1311 and a far rack 1312. The handles 11 are protected from the heat OH by being outside the hibachi 131.

Figure 14:
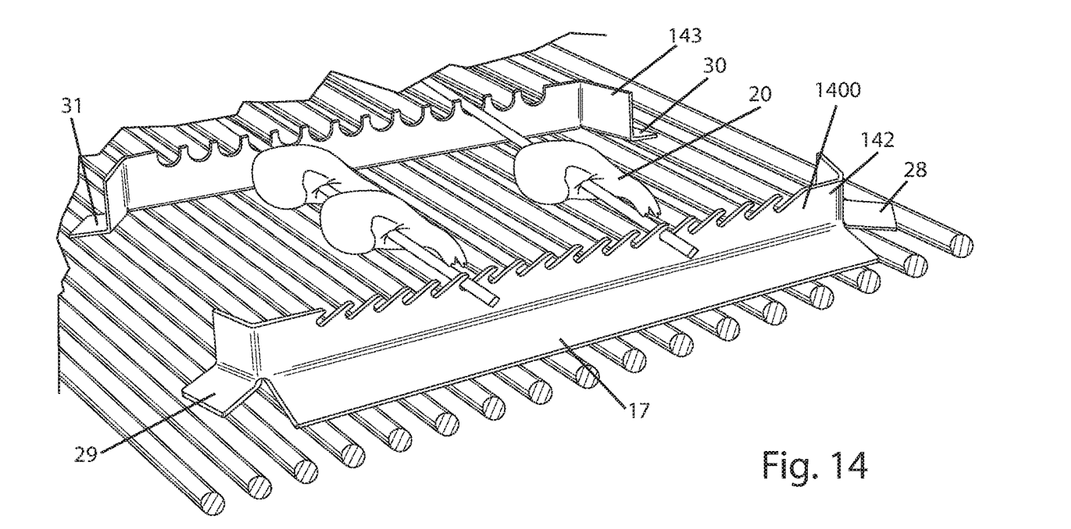
FIG. 14 is a front elevation view of an alternate groove design.

Referring next to FIG. 14 the base 17 of rack 142 has the same slant as rack 1 of FIG. 1. However, a slanted groove set 1400 is used. Rear rack 143 is the same as rack 1.

Figure 15:
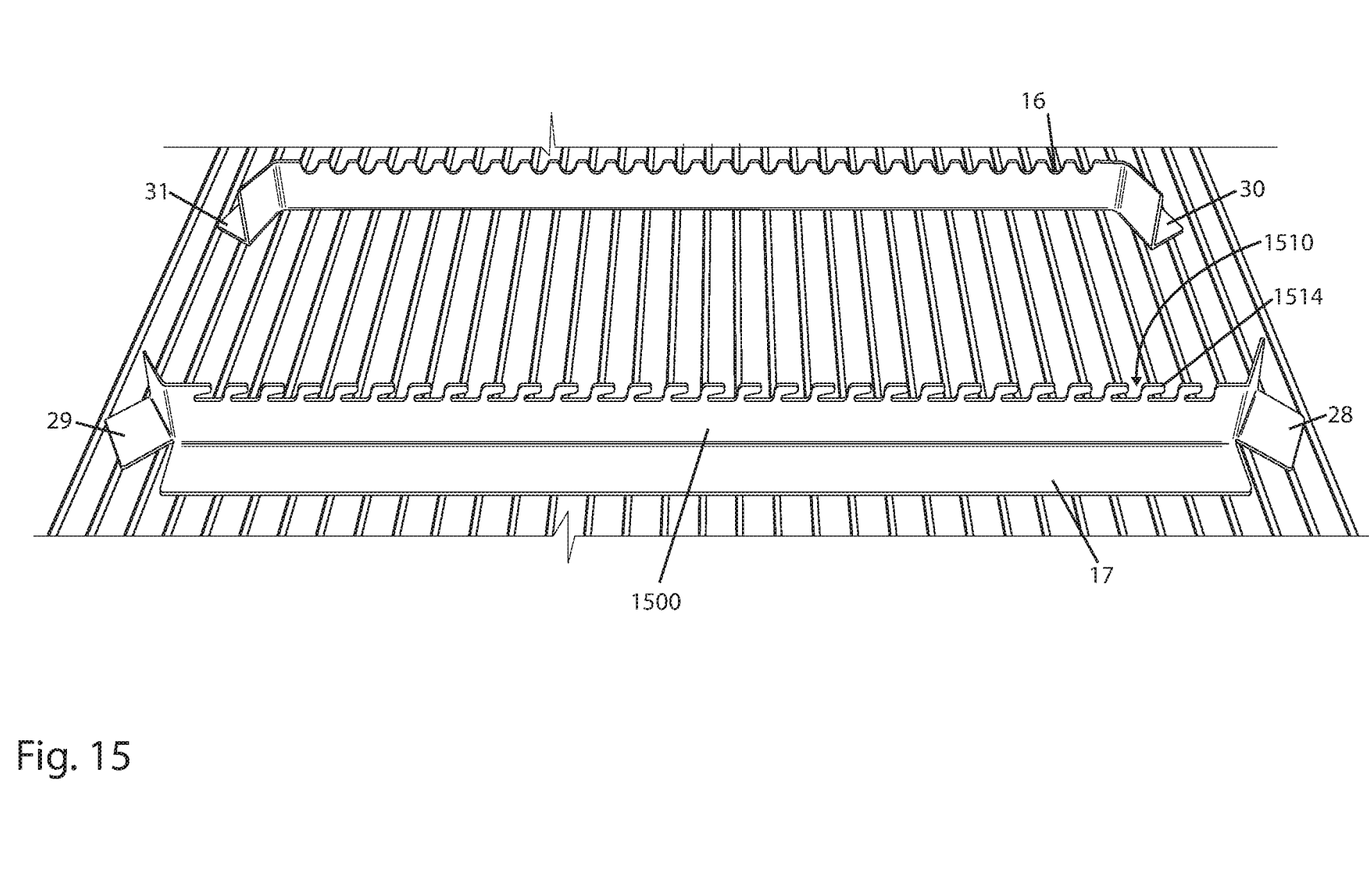
FIG. 15 is a front elevation view of a second alternate groove design.

Referring next to FIG. 15 the base 17 of rack 1500 has the same slant as rack 1 of FIG. 1. However, a series of locking grooves 1510 with lips 1514 eliminate any vertical slots.

While a number of exemplifying features and embodiments have been discussed above, those of skill in the art will recognize certain modifications, permutations, additions and sub combinations thereof. No limitation with respect to the specific embodiments disclosed herein is intended or should be inferred.

I claim:

1. A skewer rack assembly comprising:
a chef side rack positionable to face a far side rack;
said chef side rack and far side rack having a vertical support wall and a base extending outbound longitudinally along the vertical support wall;
said base having a downward taper from the vertical support walls to an outbound edge;
and
a flange positioned at each end of the chef side rack and far side rack, each flange consisting of a vertical member, angled inward toward the opposite rack when both the chef side rack and far side rack are arranged for stabilizing a food laden flat skewer across the two racks, and a horizontally angled member, extending outward angularly from a bottom of each vertical member, the vertical member abutted to each end of the vertical support walls.

2. The skewer rack assembly of claim 1, wherein the chef side rack and the far side rack nest together for storage.

3. The skewer rack assembly of claim 1, wherein the downward taper is angled to maintain the vertical wall 0.20 to 0.50 inch above a support surface.

4. The skewer rack assembly of claim 3, wherein the base further comprises a width of at least 0.5 to 1.2 inch.

5. The skewer rack assembly of claim 2, wherein the far side rack has a shape matching that of the chef side rack so as to enable the nesting.

6. The skewer rack assembly of claim 1, wherein the chef side rack vertical wall further comprises a top edge having a plurality of horizontal ledges each with an upper lip to form a skewer lock to hold a flat skewer horizontally on a long side of the flat skewer when loaded with food and a plurality of vertical notches to lock the flat skewer on a short side of the flat skewer, wherein the horizontal ledges and vertical notches are interspersed such they alternate one notch then one ledge.

7. The skewer rack assembly of claim 6, wherein the far side rack has a vertical wall with a top edge having a plurality of semi-circular grooves.

8. A skewer rack assembly comprising:
a chef side rack movable to rest opposite and parallel to a matched shaped far side rack on a grill;
each rack having a vertical wall supported above the grill by an outward facing tapered base having a width to shield skewer ends, handle and tip, from ascending heat when a skewer straddles the two racks;
each chef side rack and far side rack having a flange consisting of a vertical member, abutted to each end of each vertical wall and angled inward toward the opposite rack, and a horizontally angled member, connected to a bottom of the vertical member and angled away from the opposite rack; and
the chef side rack having a plurality of horizontal skewer lock cutouts covered in part by a lip and vertical skewer lock cutouts interspersed on the vertical wall of the chef side rack such that the plurality of horizontal skewer lock cutouts alternate to stabilize food laden flat skewers horizontally or vertically across the two racks.

9. The skewer rack assembly of claim 8, wherein the far side rack further comprises a plurality of semi-circular groves on its vertical wall.

10. The skewer rack assembly of claim 1, wherein the vertical support wall of one of the chef side rack or far side rack is longer than the other.

11. The skewer rack assembly of claim 1, wherein ach of the chef side rack and far side rack are one continuous piece.

12. The skewer rack assembly of claim 9, wherein the chef side rack and far side rack nest for storage.

13. A skewer rack assembly comprising:
a chef side rack positionable to face parallel to a far side rack to enable a skewer to straddle the two racks on a grill;
each rack having a vertical wall with an outward facing base with a downward taper from the vertical wall to secure a bottom of each vertical wall above the grill;
said outward facing base having a width of at least 0.5 inch to direct rising heat centrally between the two racks and for the base of the chef side and far side rack to deter a burning of a handle of a wooden skewer resting above the base;
the chef side rack vertical wall further comprising horizontal skewer cutouts and vertical cutouts interspersed between each other, functioning to secure a flat food laden skewer flat side down and end down respectively; and
each chef side rack and far side rack having a flanges on each end of the respective racks, each flange comprising a vertical member, the vertical member abutting each end of each vertical wall and angled inward towards the opposite rack, and a horizontally angled member connected to a bottom of the vertical member and angled away from the other rack.

14. The skewer rack assembly of claim 13, wherein the far side rack further comprises a vertical wall top edge with a plurality of semi-circular cutouts.

15. The skewer rack assembly of claim 13, wherein the chef side rack and far side rack nest for storage.

16. The skewer rack assembly of claim 14, wherein the chef side rack horizontal skewer cutouts further comprise lips covering at least half of each cutout.

17. A skewer rack assembly comprising:
a) a first rack with a first vertical member and a first base member extending from a bottom of the first vertical member at an angle, each end of the first vertical member being bent inward to form first wing members comprising first wing base members extending at an angle from a bottom of each first wing member;
b) at least one angled notch in a top of the first vertical member;
c) a second rack with a second vertical member and a second base member extending from a bottom of the second vertical member at an angle, each end of the second vertical member being bent inward to form second wing members comprising second wing base members extending at an angle from a bottom of each second wing member;
d) at least one semi-circularly shaped cutout in a top of the second vertical member; and
e) wherein the first rack and the second rack are each one continuous piece.

* * * * *